(12) United States Patent
Nilsson et al.

(10) Patent No.: US 7,256,828 B2
(45) Date of Patent: Aug. 14, 2007

(54) WEIGHTED GRADIENT BASED AND COLOR CORRECTED INTERPOLATION

(75) Inventors: Andreas Nilsson, Malmö (SE); Pierre Nordblom, Malmö (SE)

(73) Assignee: Dialog Imaging Systems GmbH, Kirchheim/Teck-Nabern (DE)

( * ) Notice: Subject to any disclaimer, the term of this patent is extended or adjusted under 35 U.S.C. 154(b) by 746 days.

(21) Appl. No.: 10/347,984

(22) Filed: Jan. 21, 2003

(65) Prior Publication Data
US 2004/0141072 A1 Jul. 22, 2004

(30) Foreign Application Priority Data
Jan. 16, 2003 (EP) .................. 03392002

(51) Int. Cl.
| H04N 3/14 | (2006.01) |
| H04N 5/335 | (2006.01) |
| H04N 9/83 | (2006.01) |
| H04N 9/68 | (2006.01) |
| H04N 1/47 | (2006.01) |
| G06K 9/00 | (2006.01) |

(52) U.S. Cl. .............. 348/273; 348/237; 348/280; 350/525; 382/167
(58) Field of Classification Search .......... 348/234, 348/237, 266, 272, 273, 280, 281, 282; 358/525; 382/162, 167
See application file for complete search history.

(56) References Cited

U.S. PATENT DOCUMENTS

| 5,373,322 A | 12/1994 | Laroche et al. ............. 348/273 |
| 5,506,619 A | 4/1996 | Adams, Jr. et al. ......... 348/272 |
| 5,596,367 A * | 1/1997 | Hamilton et al. ........... 348/272 |
| 5,629,734 A * | 5/1997 | Hamilton et al. ........... 348/272 |
| 5,652,621 A | 7/1997 | Adams, Jr. et al. ......... 348/272 |

(Continued)

FOREIGN PATENT DOCUMENTS

EP 09 64585 A2 12/1999

OTHER PUBLICATIONS

"Color CCD Imaging with RGB and CMY Filters "; Internet publication; <http://www.ghg.net/akelly/artdraf7.htm>.*

(Continued)

*Primary Examiner*—John M. Villecco
(74) *Attorney, Agent, or Firm*—Saile Ackerman LLC; Stephen B. Ackerman

(57) ABSTRACT

The apparatus and method invented are operating upon a digital image signal obtained from an image sensor. The sensor is covered with different colored filters and is only able to record the color transmitted through each specific filter into the photosite or pixel. This type of sensor is known as a color filter array or CFA sensor. The different colored filters are arranged in a predefined pattern across the sensor. To obtain a full color image the missing color information is estimated by a set of weighed values obtained by an inverted gradient function. The set of weighted values is found from the neighboring pixels in the four compass directions, north, east, west and south or is found horizontally and vertically. The surrounding pixels are corrected by the chrominance channel to better fit the center pixel in the luminance channel, prior to using the gradient functions. The chrominance channel is interpolated in a similar manner and is also corrected to better fit the center pixel before the inverted gradient functions are applied.

64 Claims, 4 Drawing Sheets

U.S. PATENT DOCUMENTS

| | | | | |
|---|---|---|---|---|
| 5,805,217 | A | | 9/1998 | Lu et al. ..................... 348/273 |
| 5,990,950 | A | * | 11/1999 | Addison ..................... 348/273 |
| 6,268,939 | B1 | | 7/2001 | Klassen et al. ............. 358/518 |
| 6,366,318 | B1 | | 4/2002 | Smith et al. ................ 348/272 |
| 6,421,084 | B1 | * | 7/2002 | Chang et al. ............... 348/273 |
| 7,088,392 | B2 | * | 8/2006 | Kakarala et al. ........... 348/272 |
| 7,148,925 | B2 | * | 12/2006 | Osada et al. ............... 348/275 |
| 2004/0141072 | A1 | * | 7/2004 | Nilsson et al. ............. 348/272 |

OTHER PUBLICATIONS

Muresan et al.; "Reconstruction of Color Images From CCD Arrays".*

"Color Filter Array Designs"; Internet Publication; <http://www.quadbloc.com/other/cfaint.htm>.*

Plataniotis; "A Unified Framework for the Consumer-Grade Image Pipeline"; Jul. 23-28, 2005;*

* cited by examiner

FIG. 1 – Prior Art

WEIGHTED GRADIENT BASED AND COLOR CORRECTED INTERPOLATION

BACKGROUND OF THE INVENTION (1) Field of the Invention

The present invention relates generally to the field of electronic imaging, and more particularly, to a color-filter array (CFA) algorithm to estimate missing color information for a digital camera having a single color sensor.

(2) Description of the Prior Art

Color is the perceptual result of light in the visible region of the spectrum, having wavelengths in the region of 400 nm to 700 nm, incident upon the retina. The spectral distribution of light relevant to the human eye is often expressed in 31 components each representing a 10 nm band.

The human retina has three types of color photoreceptors cone cells, which respond to incident radiation with somewhat different spectral response curves. Because there are exactly three types of color photoreceptor, three numerical components are necessary and sufficient to describe a color, providing that appropriate spectral weighting functions are used.

The most common consumer cameras in digital imaging today are single sensor cameras. An image sensor is constructed as an array of tiny light-sensitive diodes called photosites or pixels. The photosites themselves usually do not extract color from light; they only convert photons from a wide spectral band into electrons. In order to record color images with a single sensor, the sensor is filtered so that different photosites receive different colored illumination. This type of sensor is known as a color-filter-array or CFA sensor. The different color filters are arranged in a predefined pattern across a sensor.

The most common arrangement is the Bayer color-filter-array (CFA), which was invented at Kodak. The CFA of a color imager follows often the commonly used said "Bayer" pattern. The pattern of said Bayer CFA is showed in FIG. 1 prior art. Half of the total number of photosites is green (G), while a quarter of the total number is assigned to both red (R) and blue (B). In order to obtain this color information, the color image photosites are covered with a red, a green, or a blue filter, in a repeating pattern. This pattern, or sequence, of filters can vary, but the widely adopted "Bayer" pattern is a repeated 2×2 arrangement as shown in FIG. 1 prior art.

This pattern, showed in FIG. 1 prior art, is based on the premise that the human eye derives most of the luminance data from the green content of a scene; and it is the resolution of this luminance data that is perceived as the "resolution" of an image. Therefore, by ensuring that more of the pixels are "green", a higher resolution image can be created—compared with an alternating R-G-B color filter array with equal numbers of Red, Green and Blue photosites.

Single-sensor cameras spatially sample the incoming image using a CFA. Consequently, each photosite only contains a single color value. In order to reconstruct the original full-color image a demosaicing step must be performed which interpolates the missing colors at each pixel. Goals in CFA demosaicing include color fidelity, spatial resolution, no false colors, no jagged edges, no aliasing artifacts, and computational practicality. There is often a trade-off between a sharp image and the so-called "zipper effect" or jagged edge look. Several interpolation methods that utilize the color information in different ways are in use.

The challenge for the designer is to identify such an algorithm combining a high quality interpolation with a low computational effort.

There are various patents available dealing with said problems:

U.S. Pat. No. (6,366,318 to Smith et al.) describes a method for generating color image signals derived from an array of color image pixels, the array of color pixels are subsampled in order to generate an array of subsampled color pixels. An array of new, evenly spaced color pixels are interpolated from the subsampled color pixels using surrounding pixels of the same color, and the color image signals derived from the array of new color pixels are subsequently processed, e.g., in a color filter array interpolation. By providing this correction in a preprocessing step, the rest of the normal image processing hardware or software may be used on the resultant subsampled. CFA image without developing the characteristic blocky and wavy artifacts caused by an irregular subsampling pattern.

U.S. Pat. No. (6,268,939 to Klassen et al.) discloses a method and apparatus for improving the efficiency of color correcting subsampled luminance and chrominance-based data. More specifically, the present invention is directed to a method of applying a full conversion between color spaces for one pixel in a selected pixel block. Chrominance values are assigned to the remaining pixels based upon their luminance values relative to the luminance value of the converted pixel. The invention may be used to convert between various types of color spaces, and may be used in the processing of both device dependent and device independent data.

U.S. Pat. No. (5,506,619 to Adams et al.) describes an apparatus for processing a digitized image signal obtained from an image sensor having color photosites aligned in rows and columns that generate at least three separate color values but only one color value for each photosite location, a structure is provided which interpolates color values for each photosite location so that it has three different color values. The apparatus includes an image buffer for storing the digitized image signal and a processor operative with the buffer storing means for generating an appropriate color value missing from a photosite location by the interpolation of an additional color value for such photosite locations from color values of different colors than the missing color value at nearby photosite locations. The processor further includes a structure for obtaining Laplacian second-order values in at least two image directions from nearby photosites of the same column and row and which structure is responsive to the Laplacian second-order values for selecting a preferred orientation for the interpolation of the missing color value and for interpolating the missing color value from nearby multiple color values selected to agree with the preferred orientation.

SUMMARY OF THE INVENTION

A principal object of the present invention is to achieve a method and an apparatus for a single sensor camera to estimate missing color information provided by a color filter array.

A further object of the present invention is to achieve a system and an apparatus having a high quality interpolation with low computational costs Another further object of the present invention is to achieve a method and an apparatus providing a high quality color image.

In accordance with the objects of this invention a method to obtain a full color image by estimating the missing color information of a single sensor camera has been achieved. Said method comprises providing an exposure unit comprising a color filter array (CFA), an analog/digital converter of the raw image, an interpolation unit, and a color processing unit. The steps of the method are to interpolate the luminance channel used as proxy for green color, to interpolate the chrominance channel used as proxy for red and blue, to correct the luminance channel, and to correct the chrominance channel.

In accordance with said objects of the invention a method to obtain a full color image by estimating the missing color information of a single sensor camera has been achieved. Said method comprises providing an exposure unit comprising a C-M-Y color filter array (CFA), an analog/digital converter of the raw image, an interpolation unit, and a color processing unit. The steps of the method are to interpolate the luminance channel used as proxy for magenta, to interpolate the chrominance channel used as proxy for yellow and cyan, to correct the luminance channel, and to correct the chrominance channel.

In accordance with the objects of this invention a method to obtain a full color image by estimating the missing color information of a single sensor camera has been achieved. Said method comprises providing an exposure unit comprising a Diagonal Bayer Pattern color filter array (CFA), an analog/digital converter of the raw image, an interpolation unit, and a color processing unit. The steps of the method are to interpolate the luminance channel used as proxy for green color, to interpolate the chrominance channel used as proxy for red and blue, to correct the luminance channel, and to correct the chrominance channel.

In accordance with said objects of the invention a method to obtain a full color image by estimating the missing color information of a single sensor camera has been achieved. Said method comprises providing an exposure unit comprising a color filter array (CFA), an analog/digital converter of the raw image, an interpolation unit, and a color processing unit. The first steps of said method comprise to compute inverted and normalized gradient functions in the four compass directions using luminance and chrominance data, to interpolate the luminance considering luminance and chrominance data using results of previous step and to estimate chrominance at opposite chrominance locations using luminance and chrominance data considered. The next steps comprise to compute gradient functions, using chrominance and luminance data in specific directions, to interpolate chrominance considering chrominance and luminance data using results from previous step, to compute two gradient functions, horizontally and vertically, using information from all color channels, to correct the luminance channel horizontally and vertically if the gradient functions are not equal. The last steps comprise to estimate chrominance at opposite chrominance locations using enhanced luminance and chrominance data considered, to compute inverted and normalized gradient functions using enhanced chrominance and luminance data in specific directions, and to interpolate chrominance considering chrominance and enhanced luminance data using results from previous step.

In accordance with said objects of the invention an apparatus to obtain a full color image by estimating the missing color information of a single sensor camera has been achieved. Said apparatus comprises an exposure unit comprising a color filter array (CFA), an analog/digital converter of the raw image, an interpolation unit, wherein said interpolation unit is estimating the missing color information by a set of weighted values obtained by gradient functions and wherein the set of weighted functions is found from neighboring pixels in specific directions, and a color processing unit.

BRIEF DESCRIPTION OF THE DRAWINGS

In the accompanying drawings forming a material part of this description, there is shown:

FIG. 1 prior art shows the basic layout of a R-G-B color array

DESCRIPTION OF THE PREFERRED EMBODIMENTS

The preferred embodiments disclose an apparatus and a method to achieve high quality images by using a high quality interpolation of chrominance and luminance values combined with a low computational cost.

The RGB color space primarily indicates the levels of Red, Green and Blue in a photosite location and thus is a measure of the spectrum. An RGB color space image such as one resulting from color interpolating of a Bayer pattern image also has both "chrominance" and "luminance" information. Luminance refers generally to the level of brightness in an image or photosite, whereas chrominance refers to the hue or placement of color in the color spectrum and saturation or intensity of that hue. A one-color per photosite image is equivalent to a sum of luminance and opponent chromatic signals. In the case of a regular CFA arrangement, luminance and chrominance are well localized in the spatial frequency domain, providing a way to estimate them by appropriate frequency selections. In a RGB image, the Green color plane associated pixels contain most of the luminance information while Blue and Red associated pixels contain most of the chrominance information. This is why a Bayer CFA consists of twice as much "green color filters" than "red or blue color filters". The fact, that the luminance, approximated by green image data, is more accurately estimated, is the reason to interpolate the chrominance channels, approximated by red and blue color channels, after the luminance channel. Based on this, the luminance is interpolated as accurate as possible to avoid that data from that channel will produce wrong modifications in the chrominance channels.

A fundamental part of the invention is that luminance is used as a proxy for the green channel and chrominance is used as a proxy for the red and blue channel. The fact, that the luminance is more accurate, is the reason to interpolate the chrominance channels after the luminance channel. Based on this the luminance is interpolated as accurate as possible to avoid that data from that channel will produce wrong modifications in the chrominance channels.

Figure 2:
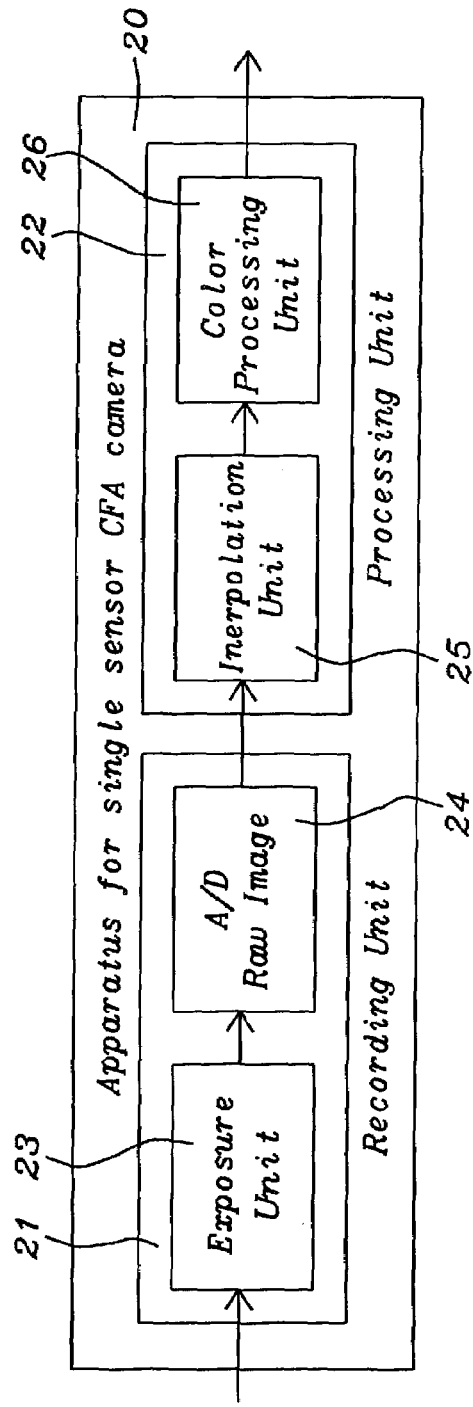
FIG. 2 shows a functional block diagram of the components of single sensor CFA camera having an interpolation unit.

FIG. 2 shows the basic components of the front end 20 of a single sensor CFA invented. Said front end 20 comprises two parts, a recording unit 21 and a processing unit 22. Said recording unit 21 comprises two modules, an exposure unit 23 and an analog/digital converter of the raw image 24, said processing unit 22 comprises two modules, an interpolation unit 25 and a color-processing unit 26. Said interpolation unit 25 is a key part of the invention.

Figure 3:
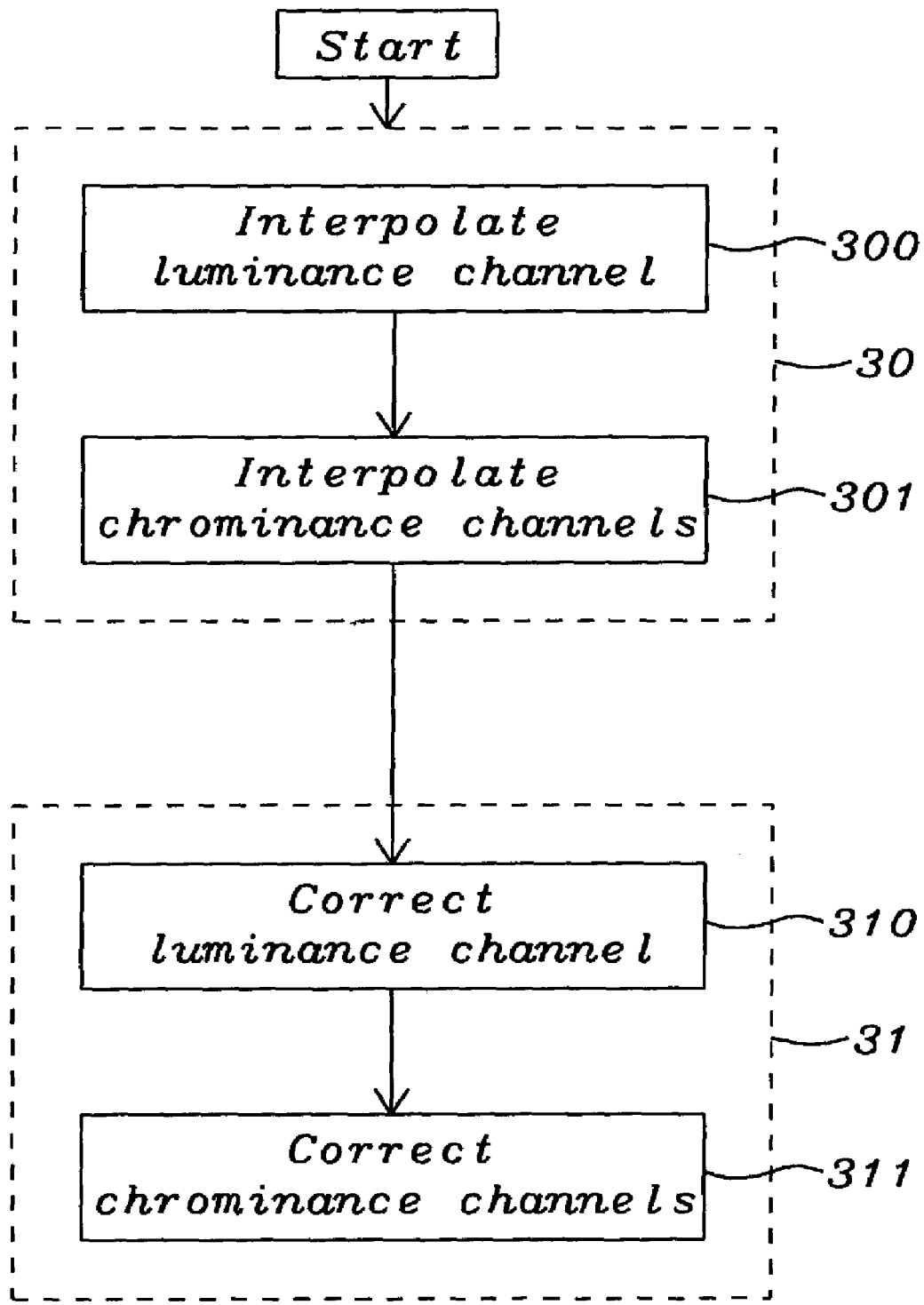
FIG. 3 shows a flowchart of the major steps of the method invented.

FIG. 3 shows a functional block diagram of the interpolation method invented Said method comprises two basic steps. The first basic step 30 comprises the interpolation of the luminance channel 300 and the interpolation of the chrominance channels 301, the next basic step 31 comprises the correction of the luminance channel 310 followed by the correction of the chrominance channel 311.

Figure 4:
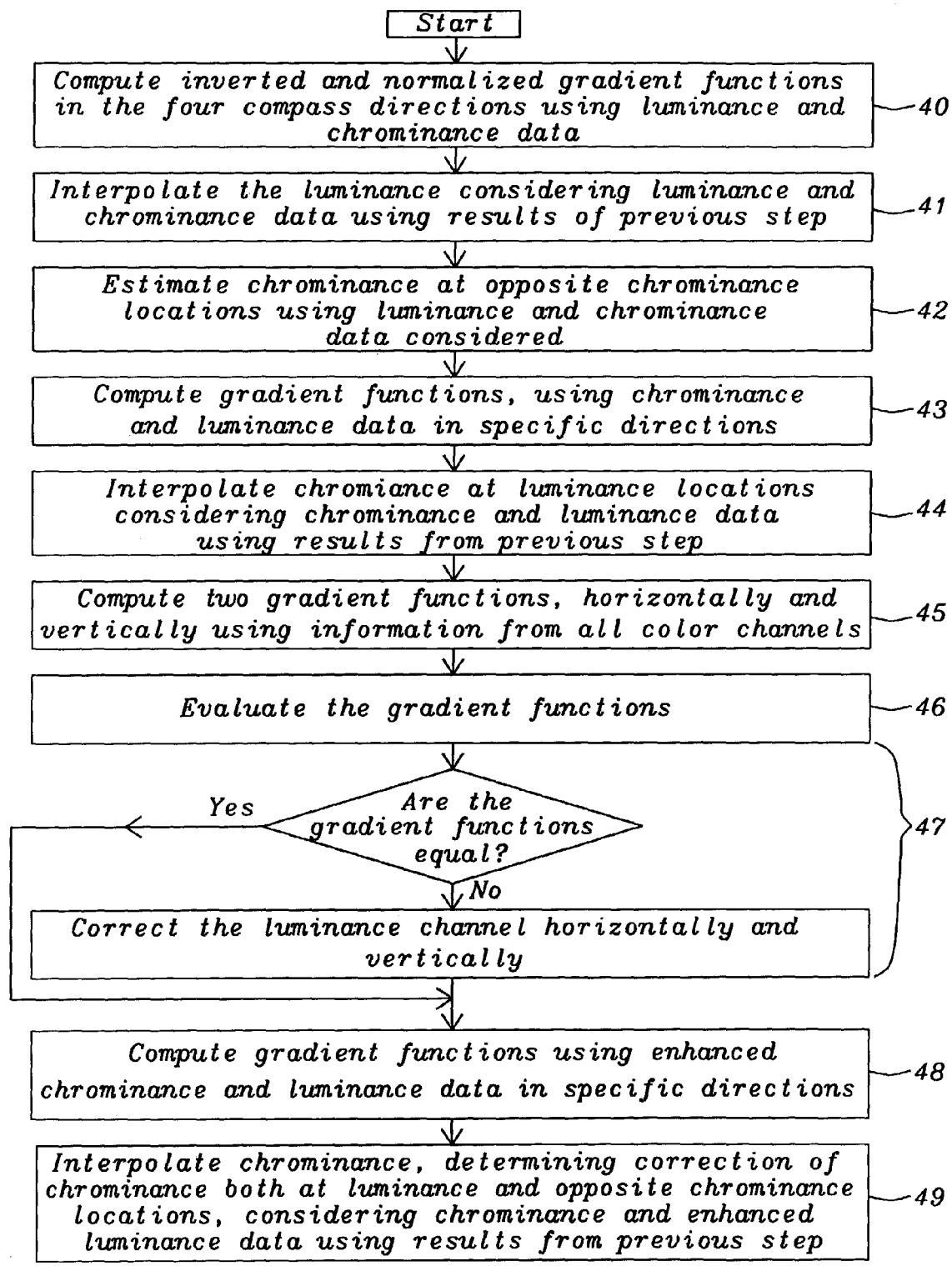
FIG. 4 shows a flowchart of the detailed steps of a embodiment of the method invented.

FIG. 4 shows a more detailed functional block diagram compared to the overview of FIG. 3. Step 300 of FIG. 3 is divided into two steps, steps 40 and 41 of FIG. 4. The algorithm invented begins in step 40 with an examination of the neighborhood considered, where it looks for high spatial frequency information in the four compass directions; north, south, east and west. This examination involves gradient information not only from the luminance channel, but also from the color channel that is to be interpolated. Since we want to interpolate along edges and not across them, we form an inverted gradient function, $f_{grad}$, which weights the gradient functions so that the smallest gradient carries the greatest weight, while the greatest gradient carries the least weight. The intention of weighting the gradients is to find a value well representing the surrounding neighbors. In order to simplify the interpolation equations, the function $f_{grad}$ is normalized, represented by $F_n$. In order to get an even more accurate estimation of the missing luminance value, the chrominance values are used for correction to get a better fit between the different color channels.

First the gradient functions are defined as:

$$\Delta W = |2L_{(x-1,y)} - L_{(x-3,y)} - L_{(x+1,y)}| + |C_{(x,y)} - C_{(x-2,y)}|,$$

$$\Delta E = |2L_{(x+1,y)} - L_{(x-1,y)} - L_{(x+3,y)}| + |C_{(x,y)} - C_{(x+2,y)}|,$$

$$\Delta N = |2L_{(x,y-1)} - L_{(x,y-3)} - L_{(x,y+1)}| + |C_{(x,y)} - C_{(x,y-2)}|,$$

$$\Delta S = |2L_{(x,y+1)} - L_{(x,y-1)} - L_{(x,y+1)}| + |C_{(x,y)} - C_{(x,y+2)}|, \qquad (1)$$

wherein $L_{(i,j)}$ is the luminance, approximated by green and $C_{(i,j)}$ is the chrominance, approximated by red and blue.

Next, these gradients are inverted:

$$f_{grad}(x) = \frac{1}{x} \quad \text{for} \quad x \neq 0, \text{ and} \qquad (2)$$

$$f_{grad}(x) = 1 \quad \text{for} \quad x = 0, \qquad (2)$$

wherein x are the gradient functions of the equations (1) shown above.

Next, the inverted gradient functions are normalized:

$$F_n(x) = \frac{f_{grad}(x)}{f_{grad}(\Delta W) + f_{grad}(\Delta E) + fgrad(\Delta N) + f_{grad}(\Delta S)} \qquad (3)$$

wherein x are the gradient functions of the equations (1) shown above.

The next step 41 is the interpolation of missing luminance values utilizing the normalized inverted gradient functions $F_n(x)$ as shown above:

$$L_{(x,y)} = F_n(\Delta W)L_{(x-1,y)} + F_n(\Delta E)L_{(x+1,y)} + F_n(\Delta N)L_{(x,y-1)} + F_n(\Delta S)L_{(x,y+1)} +$$

$$\frac{C_{(x,y)} - F_n(\Delta W)C_{(x-2,y)} - F_n(\Delta E)C_{(x+2,y)} - F_n(\Delta N)C_{(x,y-2)} - F_n(\Delta S)C_{(x,y+2)}}{2}, \qquad (4)$$

wherein $L_{(i,j)}$ is the luminance, approximated by green and $C_{(i,j)}$ is the chrominance, approximated by red or blue.

Step 301 of FIG. 3, comprising the interpolation of chrominance channels, is divided into the three steps 42, 43, and 44 of FIG. 4. Said chrominance channels are approximated by red and blue. The assumption that the green channel is a good proxy for luminance and the red and blue channel for chrominance is further utilized and thus the interpolation in the chrominance channels is done in the same manner. Step 42 comprises the estimation of chrominance at opposite chrominance locations using luminance and chrominance data considered. The next equation shows for example:

$$C_{(x,y)} = L_{(x,y)} + \frac{(C_{(x-1,y-1)} - L_{(x-1,y-1)}) + (C_{(x+1,y-1)} - L_{(x+1,y-1)})}{4} + \frac{(C_{(x-1,y+1)} - L_{(x-1,y+1)}) + (C_{(x+1,y+1)} - L_{(x+1,y+1)})}{4} \qquad (5)$$

wherein $L_{(i,j)}$ is the luminance, approximated by green and wherein $C_{(i,j)}$ is the chrominance, approximated by red and blue.

In the following step 43 the inverted and normalized gradient functions are computed in the four compass directions using chrominance and luminance data. In the above shown equation (5) the chrominance channels are populated to the same structure as the luminance had before the interpolation. Said previous step 42 is enhanced now by introducing an examination of the gradients in the four compass directions: north, south, east and west. The gradient functions are formed as:

$$\Delta W = |2C_{(x-1,y)} - C_{(x-3,y)} - C_{(x+1,y)}| + |L_{(x,y)} - L_{(x-1,y)}|,$$

$$\Delta E = |2C_{(x+1,y)} - C_{(x-1,y)} - C_{(x+3,Y)}| + |L_{(x,y)} - L_{(x+1,y)}|,$$

$$\Delta N = |2C_{(x,y-1)} - C_{(x,y-3)} - C_{(x,y+1)}| + |L_{(x,y)} - L_{(x,y-1)}|,$$

$$\Delta S = |2C_{(x,y+1)} - C_{(x,y-1)} - C_{(x,y+3)}| + |L_{(x,y)} - L_{(x,y+1)}|, \qquad 6$$

wherein $C_{(i,j)}$ is the chrominance, approximated by red or blue and wherein $L_{(i,j)}$ is the luminance, approximated by green.

These gradient functions are inverted and normalized now equivalent to the inversion and normalization shown in equation (2) and (3). The next step 44 comprises interpolating the chrominance channels by the interpolation at luminance locations utilizing the inverted gradient function $F_n(x)$ as:

$$C_{(x,y)} = F_n(\Delta W)C_{(x-1,y)} + F_n(\Delta E)C_{(x+1,y)} + F_n(\Delta N)$$
$$C_{(x,y-1)} + F_n(\Delta S)C_{(x,y+1)} + +L_{(x,y)}F_n(\Delta W)L_{(x-1,y)} -$$
$$F_n(\Delta E)L_{(x+1,y)} - F_n(\Delta N)L_{(x,y-1)} - F_n(\Delta S)L_{(x,y+1)}, \qquad (7)$$

wherein $C_{(i,j)}$ is the chrominance, approximated by red or blue and wherein $L_{(i,j)}$ is the luminance, approximated by green.

Step 310 of FIG. 3, comprising the correction of the computed values of the luminance channel, is divided into the three steps 45, 46, and 47 of FIG. 4. In step 45 the correction starts by defining horizontal gradient function $\Delta H$ and vertical gradient function ΔV. Said correction contains gradient information from all color channels. The equivalent equations are:

$$\Delta H = |2L_{(x,y)} - L_{(x-1,y)} - L_{(x+1,y)}| + |C_{(x-1,y)}^R - C_{(x+1,y)}^R| + |C_{(x-1,y)}^R - C_{(x+1,y)}^R| \text{ and}$$

$$\Delta V = |2L_{(x,y)} - L_{(x,y-1)} - L_{(x,y+1)}| + |C_{(x,y-1)}^R - C_{(x,y+1)}^R| + |C_{(x-1,y)}^R - C_{(x+1,y)}^R|, \quad (8)$$

wherein $L_{(i,j)}$ is the luminance, approximated by green, $C_{(i,j)}^R$ is the red chrominance channel and $C_{(i,j)}^B$ is the blue chrominance channel.

In step 46 both gradient functions for ΔH and ΔV are compared. In the following step 47 both gradients are evaluated and in case both gradients are not equal an additional correction of the luminance data in horizontal and vertical direction is performed. In case both gradients are equal said correction will be skipped. For said correction of the luminance channel the following equations are applied (9):

$$L_{(x,y)} = \frac{2L_{(x,y)} + L_{(x-1,y)} + L_{(x+1,y)}}{4} +$$

$$\frac{2C_{(x,y)}^R + 2C_{(x,y)}^B - C_{(x-1,y)}^R - C_{(x-1,y)}^B - C_{(x+1,y)}^R - C_{(x+1,y)}^B}{16}$$

for ΔH < ΔV $$L(x, y) = \frac{2L_{(x,y)} + L_{(x,y-1)} + L_{(x,y+1)}}{4} +$$

$$\frac{2C_{(x,y)}^R + 2C_{(x,y)}^B - C_{(x,y-1)}^R - C_{(x,y-1)}^B - C_{(x,y+1)}^R - C_{(x,y+1)}^B}{16}$$

for ΔH > ΔV wherein $L_{(i,j)}$ is the luminance, approximated by green, $C_{(i,j)}^R$ is the red chrominance and $C_{(i,j)}^R$ is the blue chrominance.

Step 311 of FIG. 3, comprising the correction of the computed values of the chrominance channel, is divided into the two steps 48 and 49 of FIG. 4. The correction of the chrominance channels is performed following the same interpolation principle as used when interpolating the luminance channel.

In step 48 the gradient functions are redefined compared to equation (6):

$$\Delta W = |2C_{(x-1,y)} - C_{(x-2,y)} - C_{(x+1,y)}| + |L_{(x,y)} - L_{(x-1,y)}|,$$

$$\Delta E = |2C_{(x+1,y)} - C_{(x-1,y)} - C_{(x+2,y)}| + |L_{(x,y)} - L_{(x+1,y)}|,$$

$$\Delta N = |2C_{(x,y-1)} - C_{(x,y-2)} - C_{(x,y+1)}| + |L_{(x,y)} - L_{(x,y-1)}|,$$

$$\Delta S = |2C_{(x,y+1)} - C_{(x,y-1)} - C_{(x,y+2)}| + |L_{(x,y)} - L_{(x,y+1)}|, \quad (10)$$

Using the modified gradient functions computed according to the above shown equations 10, the chrominance values are corrected in step 49 by interpolation using equation (7) as in step 44.

Figure 5:
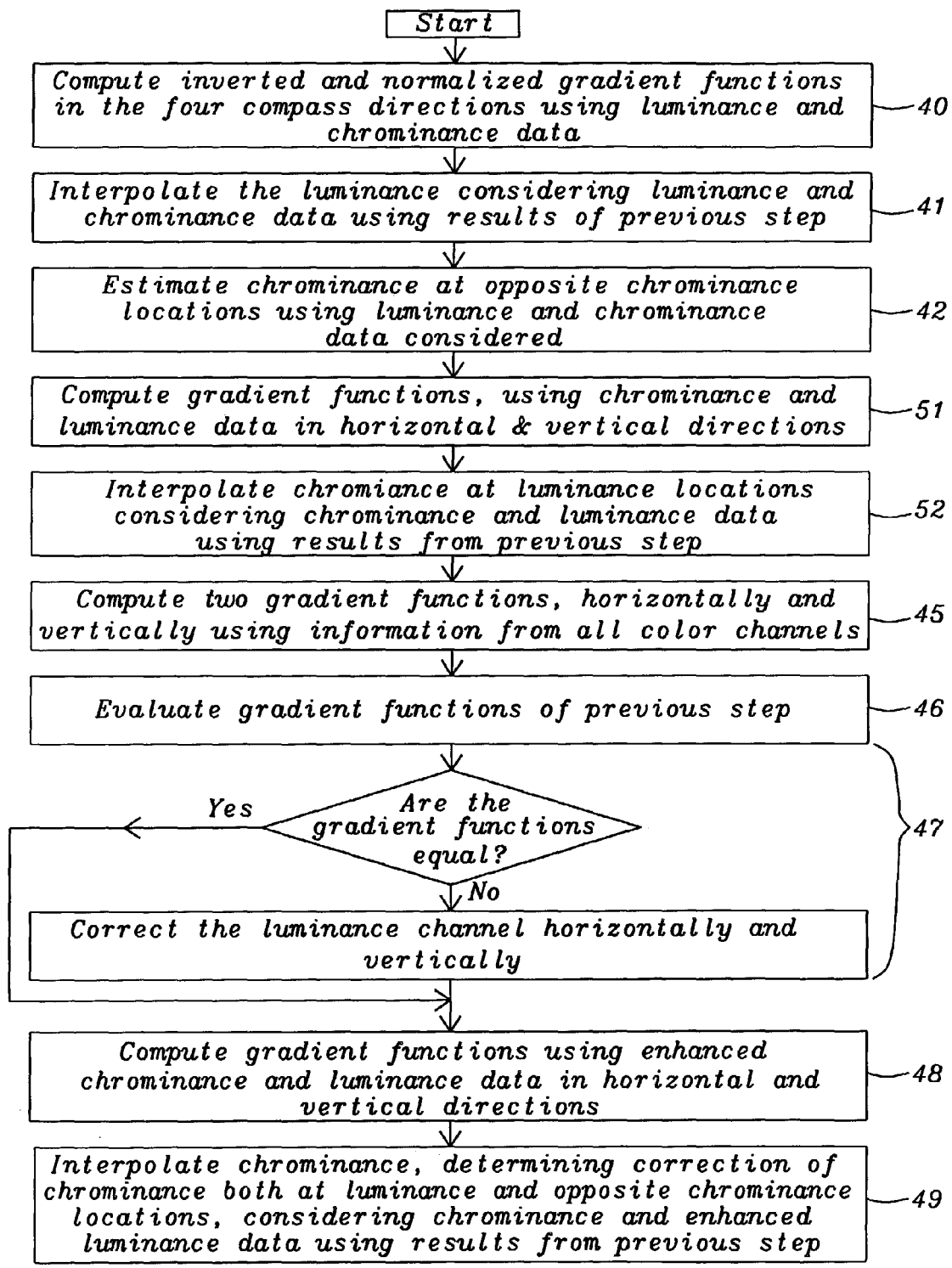
FIG. 5 shows a flowchart of the detailed steps of an alternative embodiment of the method invented

FIG. 5 describes an alternative method how to perform the interpolation and correction of the chrominance channels replacing steps 43, 44 and steps 48-49 shown in FIG. 4. The interpolation of the luminance channel, as shown in steps 40 and 41 of FIG. 4, remains unchanged. Step 42, comprising an estimation of chrominance at opposite chrominance locations using equation (5), remains unchanged as well. Step 43 of FIG. 4, the computation of gradient functions, is replaced by step 51. Instead of using the inverted weighted function to determine how the surrounding pixels in the four compass directions will be utilized, described in step 43, a horizontal gradient function ΔH and a vertical gradient function ΔV are calculated in the alternative approach. Said gradient functions are formed as:

$$\Delta H = |C_{(x-1,y)} - C_{(x+1,y)}| + \left|\frac{2L_{(x,y)} - L_{(x-2,y)} - L_{(x+2,y)}}{2}\right| \text{ and} \quad (11)$$

$$\Delta V = |C_{(x,y-1)} - C_{(x,y+1)}| + \left|\frac{2L_{(x,y)} - L_{(x,y-2)} - L_{(x,y+2)}}{2}\right|,$$

wherein $C_{(i,j)}$ is the chrominance, approximated by red or blue and wherein $L_{(i,j)}$ is the luminance, approximated by green.

The next step 52 to get fully populated chrominance channels is the interpolation of the remaining chrominance pixel values correspondent to step 44 of FIG. 4. In this alternative approach the equation (7) used in step 44 is modified in step 52 using the values of ΔH and ΔV as computed according to the equation (11) above. The modified equations to calculate the remaining pixel values are:

$$C_{(x,y)} = L_{(x,y)} + \frac{(C_{(x-1,y)} - L_{(x-1,y)}) + (C_{(x+1,y)} - L_{(x+1,y)})}{4}, \quad (12)$$

if ΔH < ΔV or $$C_{(x,y)} = L_{(x,y)} + \frac{(C_{(x,y-1)} - L_{(x,y-1)}) + (C_{(x,y+1)} - L_{(x,y+1)})}{4},$$

if ΔH > ΔV or $$C_{(x,y)} = L_{(x,y)} + \frac{(C_{(x-1,y)} - L_{(x-1,y)}) + (C_{(x+1,y)} - L_{(x+1,y)})}{4} +$$

$$+ \frac{(C_{(x,y-1)} - L_{(x,y-1)}) + (C_{(x,y+1)} - L_{(x,y+1)})}{4}, \text{ if } \Delta H = \Delta V,$$

wherein $C_{(i,j)}$ is the chrominance, approximated by red or blue and wherein $L_{(i,j)}$ is the luminance, approximated by green.

The following steps 45 to 47, covering the correction of the luminance channel, remain unchanged.

The computation of the gradient functions as part of the correction of the chrominance, described in step 48 of FIG. 4, can also be replaced alternatively with step 53 and is taking advantage of the enhanced luminance channel calculated in steps 45, 46 and 47.

The gradient functions shown in equation (11) are redefined in step 53 as follows:

$$\Delta H = |C_{(x-1,y)} - C_{(x+1,y)}| + \left|\frac{2L_{(x,y)} - L_{(x-1,y)} - L_{(x+1,y)}}{2}\right| \text{ and} \quad (13)$$

$$\Delta V = |C_{(x,y-1)} - C_{(x,y+1)}| + \left|\frac{2L_{(x,y)} - L_{(x,y-1)} - L_{(x,y+1)}}{2}\right|,$$

wherein $C_{(i,j)}$ is the chrominance, approximated by red or blue and wherein $L_{(i,j)}$ is the luminance, approximated by green.

In this alternative approach equation (12) is used again in step 54 to perform the final correction of chrominance pixel values using both luminance and chrominance values of opposite locations. In said approach the gradient functions of equation (13) are used now.

Furthermore it is possible to use the alternative steps 51 and 52, describing the interpolation of the chrominance channel, combined with the correction of the chrominance channel described in steps 48 and 49. It is also possible to perform the interpolation of the chrominance channel as described in steps 43 and 44 and to do the correction of the chrominance channel using the alternative steps 53 and 54.

Another alternative approach deals with the interpolation of the luminance channel modifying step 40-41 shown in FIG. 4 and in FIG. 5. Step 40 comprises the computation of inverted and normalized gradient functions in four compass directions. The computation of the gradient functions in the four compass directions as described in step 40 using equation (1) is replaced by a computation of the gradient functions in horizontal and vertical directions:

$$\Delta H = |L_{(x-1,y)} - L_{(x+1,y)}| + \left|\frac{2C_{(x,y)} - C_{(x-2,y)} - C_{(x+2,y)}}{2}\right| \text{ and} \quad (14)$$

$$\Delta V = |L_{(x,y-1)} - L_{(x,y+1)}| + \left|\frac{2C_{(x,y)} - C_{(x,y-2)} - C_{(x,y+2)}}{2}\right|,$$

wherein $C_{(i,j)}$ is the chrominance, approximated by red or blue and wherein $L_{(i,j)}$ is the luminance, approximated by green.

In this alternative method the inversion of the gradients, as performed in equation (2), and the normalization of the gradient, as performed in equation (3), are obsolete and the interpolation of the luminance, shown in step 41, is performed using the following equations (15), replacing equation (4):

$$L_{(x,y)} = C_{(x,y)} + \frac{(L_{(x-1,y)} - C_{(x-1,y)}) + (L_{(x+1,y)} - C_{(x+1,y)})}{4}, \quad (15)$$
$$\text{if } \Delta H < \Delta V \text{ or}$$

$$L_{(x,y)} = C_{(x,y)} + \frac{(L_{(x,y-1)} - C_{(x,y-1)}) + (L_{(x,y+1)} - C_{(x,y+1)})}{4},$$
$$\text{if } \Delta H > \Delta V \text{ or}$$

$$L_{(x,y)} = C_{(x,y)} + \frac{(L_{(x-1,y)} - C_{(x-1,y)}) + (L_{(x+1,y)} - C_{(x+1,y)})}{4} +$$
$$+ \frac{(L_{(x,y-1)} - C_{(x,y-1)}) + (L_{(x,y+1)} - C_{(x,y+1)})}{4}, \text{ if } \Delta H = \Delta V,$$

wherein $C_{(i,j)}$ is the chrominance, approximated by red or blue and wherein $L_{(i,j)}$ is the luminance, approximated by green.

The different methods described above are not limited to a R-G-B CFA only. The complementary Bayer pattern is another CFA which can be used:

| M | C |
| Y | M |

Said complementary Bayer pattern comprises three colors, being complementary to the R-G-B pattern: Cyan, Magenta, and Yellow (CMY), as shown in the table above. There are two different ways to use the methods described above providing a CMY CFA. The first alternative is to convert the CMY pattern into a RGB pattern and proceed exactly as described. The other alternative is to use said CMY CFA directly by using luminance as proxy for magenta and chrominance as proxy for yellow and cyan and proceed as described above.

The Diagonal Bayer Pattern and its complementary version are other alternatives of CFAs to be used with the invention presented. The table below shows such a Diagonal Bayer Pattern with the colors Red, Green and Blue.

| G | B | G | R |
| R | G | B | G |
| G | R | G | B |
| R | G | B | G |

Using said Diagonal Bayer Pattern the equation (5) in step 43 has to be replaced by the following equation:.

$$C_{(x,y)} = L_{(x,y)} + \frac{(C_{(x-1,y+1)} - L_{(x-1,y+1)}) + (C_{(x+1,y-1)} - L_{(x+1,y-1)})}{2}, \quad (16)$$

wherein $C_{(i,j)}$ is the chrominance, approximated by red or blue and wherein $L_{(i,j)}$ is the luminance, approximated by green. The complementary version of said Diagonal Bayer pattern can be easily implemented by using luminance as proxy for magenta and chrominance as proxy for yellow and cyan and proceed as described above.

While the invention has been particularly shown and described with reference to the preferred embodiments thereof, it will be understood by those skilled in the art that various changes in form and details may be made without departing from the spirit and scope of the invention.

The invention claimed is:

1. A method to obtain a full color image by estimating the missing color information of a single sensor camera comprising:
   providing an exposure unit comprising a color filter array (CFA), an analog/digital converter of the raw image, an interpolation unit, and a color processing unit;
   interpolating luminance channel comprising
      computing inverted and normalized gradient functions in the four compass directions using luminance and chrominance data; and then
      interpolating the luminance considering luminance and chrominance using results of said computing inverted and normalized gradient functions;
   interpolating chrominance channel;
   correcting luminance channel; and
   correcting chrominance channel.

2. The method of claim 1 wherein said color filter array is a Bayer Pattern CFA.

3. The method of claim 1 wherein said color filter array is a C-M-Y OFA and wherein said C-M-Y values are converted to R-G-B values.

4. The method of claim 1 wherein said color filter array is a Diagonal Bayer Pattern CFA.

5. The method of claim 1 wherein said color filter array is a Complementary Diagonal Bayer Pattern CFA.

6. The method of claim 1 wherein said computation of inverted and normalized gradient functions in the four compass direction is comprises:
   equations to compute the gradient functions comprising:

$$\Delta W = |2L_{(x-1,y)} - L_{(x-3,y)} - L_{(x+1,y)}| + |C_{(x,y)} - C_{(x-2,y)}|,$$

$$\Delta E = |2L_{(x+1,y)} - L_{(x-1,y)} - L_{(x+3,y)}| + |C_{(x,y)} - C_{(x+2,y)}|,$$

$$\Delta N = |2L_{(x,y-1)} - L_{(x,y-3)} - L_{(x,y+1)}| + |C_{(x,y)} - C_{(x,y-2)}|, \text{ and}$$

$$\Delta S = |2L_{(x,y+1)} - L_{(x,y-1)} - L_{(x,y+1)}| + |C_{(x,y)} - C_{(x,y+2)}|,$$

wherein $L_{(i,j)}$ is the luminance, approximated by green and $C_{(i,j)}$ is the chrominance, approximated by red and blue;

equations to invert these gradients above comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and equations to normalize the inverted gradient functions above comprising:

$$F_n(x) = \frac{f_{grad}(x)}{f_{grad}(\Delta W) + f_{grad}(\Delta E) + f_{grad}(\Delta N) + f_{grad}(\Delta S)}$$

wherein x are the gradient functions of the equations shown above.

7. The method of claim 1 wherein said interpolation of the luminance considering luminance and chrominance data using results of said computing inverted and normalized gradient functions comprises an equation to interpolate missing luminance values utilizing normalized inverted gradient function in four compass directions:

$$L_{(x,y)} = $$

$$F_n(\Delta W)L_{(x-1,y)} + F_n(\Delta E)L_{(x+1,y)} + F_n(\Delta N)L_{(x,y-1)} + F_n(\Delta S)L_{(x,y+1)} +$$

$$\frac{C_{(x,y)} - F_n(\Delta W)C_{(x-2,y)} - F_n(\Delta E)C_{(x+2,y)} - F_n(\Delta N)C_{(x,y-2)} - F_n(\Delta S)C_{(x,y+2)}}{2},$$

wherein $L_{(i,j)}$ is the luminance, approximated by green and $C_{(i,j)}$ is the chrominance, approximated by red or blue.

8. The method of claim 1 wherein said interpolation of the chrominance channels comprises:

estimating chrominance at opposite chrominance locations using luminance and chrominance data considered;

computing inverted and normalized gradient functions in the four compass directions using said estimated chrominance and luminance data; and interpolate chrominance considering chrominance and luminance data using results of said computing inverted and normalized gradient functions in the four compass directions using said estimated chrominance and luminance data.

9. The method of claim 8 wherein said estimation of chrominance at opposite chrominance locations comprises an equation to compute said estimation:

$$C_{(x,y)} = L_{(x,y)} + \frac{(C_{(x-1,y-1)} - L_{(x-1,y-1)}) + (C_{(x+1,y-1)} - L_{(x+1,y-1)})}{4} +$$

$$\frac{(C_{(x-1,y+1)} - L_{(x-1,y+1)}) + (C_{(x+1,y+1)} - L_{(x+1,y+1)})}{4}$$

wherein $L_{(i,j)}$ is the luminance, approximated by green and wherein $C_{(i,j)}$ is the chrominance, approximated by red and blue.

10. The method of claim 8 wherein said computation of inverted and normalized gradient functions in the four compass directions using chrominance and luminance data comprises:

equations to compute said gradient functions comprising:

$$\Delta W = |2C_{(x-1,y)} - C_{(x-3,y)} - C_{(x+1,y)}| + |L_{(x,y)} - L_{(x-2,y)}|,$$

$$\Delta E = |2C_{(x+1,y)} - C_{(x-1,y)} - C_{(x+3,y)}| + |L_{(x,y)} - L_{(x+2,y)}|,$$

$$\Delta N = |2C_{(x,y-1)} - C_{(x,y-3)} - C_{(x,y+1)}| + |L_{(x,y)} - L_{(x,y-2)}|, \text{ and}$$

$$\Delta S = |2C_{(x,y+1)} - C_{(x,y-1)} - C_{(x,y+1)}| + |L_{(x,y)} - L_{(x,y+2)}|,$$

wherein $C_{(i,j)}$ is the chrominance, approximated by red or blue and wherein $L_{(i,j)}$ is the luminance, approximated by green;

equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and an equation to normalize said inverted gradient functions:

$$F_n(x) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

11. The method of claim 8 wherein said interpolation of chrominance considering chrominance and luminance data using results of previous step comprise an equation to interpolate the chrominance channels at luminance locations utilizing said inverted and normalized gradient functions $F_n(x)$:

$$C_{(x,y)} = F_n(\Delta W)C_{(x-1,y)} + F_n(\Delta E)C_{(x+1,y)} + F_n(\Delta N)C_{(x,y-1)} + F_n(\Delta S)C_{(x,y+1)} + + L_{(x,y)} - F_n(\Delta W)L_{(x-1,y)} - F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by red or blue and wherein $L_{(i,j)}$ is the luminance, approximated by green.

12. The method of claim 1 wherein said correction of the luminance channel comprises:

computing two gradient functions, horizontally and vertically, using information from all color channels; and correcting luminance channel, horizontally or vertically, if, after evaluation, the gradient functions are not equal.

13. The method of claim 12 wherein said computation of two gradient functions comprises the equations:

$$\Delta H = |L_{(x-1,y)} - L_{(x+1,y)}| + \left|\frac{2C_{(x,y)} - C_{(x-2,y)} - C_{(x+2,y)}}{2}\right| \text{ and}$$

$$\Delta V = |L_{(x,y-1)} - L_{(x,y+1)}| + \left|\frac{2C_{(x,y)} - C_{(x,y-2)} - C_{(x,y+2)}}{2}\right|,$$

wherein $L_{(i,j)}$ is the luminance, approximated by green and wherein $C_{(i,j)}^R$ is red chrominance channel and $C_{(i,j)}^B$ is the blue chrominance channel.

14. The method of claim 12 wherein said correction of the luminance channel, if, after evaluation, the gradient functions, horizontally and vertically, are not equal comprises the equations to correct the luminance channel:

$$L_{(x,y)} = \frac{2L_{(x,y)} + L_{(x-1,y)} + L_{(x+1,y)}}{4} +$$
$$\frac{2C^R_{(x,y)} + 2C^B_{(x,y)} - C^R_{(x-1,y)} - C^B_{(x-1,y)} - C^R_{(x+1,y)} - C^B_{(x+1,y)}}{16}$$

if $\Delta H < \Delta V$, or $$L_{(x,y)} = \frac{2L_{(x,y)} + L_{(x,y-1)} + L_{(x,y+1)}}{4} +$$
$$\frac{2C^R_{(x,y)} + 2C^B_{(x,y)} - C^R_{(x,y-1)} - C^B_{(x,y-1)} - C^R_{(x,y+1)} - C^B_{(x,y+1)}}{16}$$

if $\Delta H > \Delta V$, wherein $L_{(i,j)}$ is the luminance, approximated by green, $C_{(i,j)}^R$ is the red chrominance channel and $C_{(i,j)}^B$ is the blue chrominance channel.

15. The method of claim 1 wherein said correction of the chrominance channels comprises:
   computing inverted and normalized gradient functions in the four compass directions using enhanced chrominance and luminance data; and
   interpolating chrominance considering chrominance and enhanced luminance data using results from said computing inverted and normalized gradient functions in the four compass directions using enhanced chrominance and luminance data.

16. The method of claim 15 wherein said computation of inverted and normalized gradient functions in the four compass directions using enhanced chrominance and luminance data is comprising:
   equations to compute said gradient functions comprising:

$$\Delta W = |2C_{(x-1,y)} - C_{(x-2,y)} - C_{(x+1,y)}| + |L_{(x,y)} - L_{(x-1,y)}|,$$

$$\Delta E = |2C_{(x+1,y)} - C_{(x-1,y)} - C_{(x+2,y)}| + |L_{(x,y)} - L_{(x+1,y)}|,$$

$$\Delta N = |2C_{(x,y-1)} - C_{(x,y-2)} - C_{(x,y+1)}| + |L_{(x,y)} - L_{(x,y-1)}|,$$

$$\Delta S = |2C_{(x,y+1)} - C_{(x,y-1)} - C_{(x,y+2)}| + |L_{(x,y)} - L_{(x,y+1)}|,$$

wherein $C_{(i,j)}$ is the chrominance, approximated by red or blue and wherein $L_{(i,j)}$ is the luminance, approximated by green;
   equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and
   an equation to normalize said inverted gradient functions:

$$F_n(x) = \frac{f_{grad}(x)}{f_{grad}(\Delta W) + f_{grad}(\Delta E) + f_{grad}(\Delta N) + f_{grad}(\Delta S)}$$

wherein x are the gradient functions of the equations shown above.

17. The method of claim 15 wherein said interpolation of chrominance considering chrominance and enhanced luminance data using results of said computing inverted and normalized gradient functions in the four compass directions using enhanced chrominance and luminance data comprise an equation to interpolate the chrominance channels utilizing said inverted and normalized gradient functions $F_n(x)$ determining correction of chrominance both at luminance locations and opposite chrominance locations:

$$C_{(x,y)} = F_n(\Delta W)C_{(x-1,y)} + F_n(\Delta E)C_{(x+1,y)} + F_n(\Delta N)C_{(x,y-1)} + F_n(\Delta S)C_{(x,y+1)} + L_{(x,y)} - F_n(\Delta W)L_{(x-1,y)} - F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by red or blue and wherein $L_{(i,j)}$ is the luminance, approximated by green.

18. A method to obtain a full color image by estimating the missing color information of a single sensor camera comprises:
   providing an exposure unit comprising a C-M-Y color filter array (CFA), an analog/digital converter of the raw image, an interpolation unit, and a color processing unit;
   interpolating luminance channel used as proxy for magenta comprising:
      computing inverted and normalized gradient functions in the four compass directions using luminance and chrominance data; and then
      interpolating the luminance considering luminance and chrominance using results of said computing inverted and normalized gradient functions;
   interpolating chrominance channel used as proxy for yellow and cyan;
   correcting luminance channel; and
   correcting chrominance channel.

19. The method of claim 18 wherein said computation of inverted and normalized gradient functions in the four compass direction comprisesg: equations to compute the gradient functions comprising:

$$\Delta W = |2L_{(x-1,y)} - L_{(x-3,y)} - L_{(x+1,y)}| + |C_{(x,y)} - C_{(x-2,y)}|,$$

$$\Delta E = |2L_{(x+1,y)} - L_{(x-1,y)} - L_{(x+3,y)}| + |C_{(x,y)} - C_{(x+2,y)}|,$$

$$\Delta N = |2L_{(x,y-1)} - L_{(x,y-3)} - L_{(x,y+1)}| + |C_{(x,y)} - C_{(x,y-2)}|, \text{ and}$$

$$\Delta S = |2L_{(x,y+1)} - L_{(x,y-1)} - L_{(x,y+1)}| + |C_{(x,y)} - C_{(x,y+2)}|,$$

wherein $L_{(i,j)}$ is the luminance, approximated by magenta, and $C_{(i,j)}$ is the chrominance, approximated by yellow and cyan;
   equations to invert these gradients above comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and
   equations to normalize the inverted gradient functions above comprising:

$$F_n(x) = \frac{f_{grad}(x)}{f_{grad}(\Delta W) + f_{grad}(\Delta E) + f_{grad}(\Delta N) + f_{grad}(\Delta S)}$$

wherein x are the gradient functions of the equations shown above.

20. The method of claim 18 wherein said interpolation of the luminance considering luminance and chrominance data using results of previous step comprises an equation to interpolate missing luminance values utilizing normalized inverted gradient function in four compass directions:

$$L_{(x,y)} = F_n(\Delta W)L_{(x-1,y)} + F_n(\Delta E)L_{(x+1,y)} + F_n(\Delta N)L_{(x,y-1)} +$$
$$F_n(\Delta S)L_{(x,y+1)} + \frac{C_{(x,y)} - F_n(\Delta W)C_{(x-2,y)} - F_n(\Delta E)C_{(x+2,y)} - F_n(\Delta N)L_{(x,y-2)} - F_n(\Delta S)C_{(x,y+2)}}{2},$$

wherein $L_{(i,j)}$ is the luminance, approximated by magenta and $C_{(i,j)}$ is the chrominance, approximated by yellow and cyan.

21. The method of claim 18 wherein said interpolation of the chrominance channels comprises:
  estimating chrominance at opposite chrominance locations using luminance and chrominance data considered;
  computing inverted and normalized gradient functions in the four compass directions using chrominance and luminance data; and
  interpolating chrominance considering chrominance and luminance data using results of said computing inverted and normalized gradient functions.

22. The method of claim 21 wherein said estimation of chrominance at opposite chrominance locations comprises an equation to compute said estimation:

$$C_{(x,y)} = L_{(x,y)} + \frac{(C_{(x-1,y-1)} - L_{(x-1,y-1)}) + (C_{(x+1,y-1)} - L_{(x+1,y-1)})}{4} + \frac{(C_{(x-1,y+1)} - L_{(x-1,y+1)}) + (C_{(x+1,y+1)} - L_{(x+1,y+1)})}{4}$$

wherein $L_{(i,j)}$ is the luminance, approximated by magenta and $C_{(i,j)}$ is the chrominance, approximated by yellow and cyan.

23. The method of claim 21 wherein said computation of inverted and normalized gradient functions in the four compass directions using chrominance and luminance data comprises:
  equations to compute said gradient functions comprising:

$$\Delta W = |2C_{(x-1,y)} - C_{(x-3,y)} - C_{(x+1,y)}| + |L_{(x,y)} - L_{(x-2,y)}|,$$
  $$\Delta E = |2C_{(x+1,y)} - C_{(x-1,y)} - C_{(x+3,y)}| + |L_{(x,y)} - L_{(x+2,y)}|,$$
  $$\Delta N = |2C_{(x,y-1)} - C_{(x,y-3)} - C_{(x,y+1)}| + |L_{(x,y)} - L_{(x,y-2)}|, \text{ and}$$
  $$\Delta S = |2C_{(x,y+1)} - C_{(x,y-1)} - C_{(x,y+1)}| + |L_{(x,y)} - L_{(x,y+2)}|,$$

wherein $L_{(i,j)}$ is the luminance, approximated by magenta and $C_{(i,j)}$ is the chrominance, approximated by yellow and cyan;
  equations to invert said gradient functions comprising:

$$f_{grad}(x) = \frac{1}{x} \text{ for } x \neq 0, \text{ and}$$
  $$f_{grad}(x) = 1 \text{ for } x = 0,$$

wherein x are the gradient functions of the equations shown above; and
  an equation to normalize said inverted gradient functions:

$$F_n(x) = \frac{f_{grad}(x)}{f_{grad}(\Delta W) + f_{grad}(\Delta E) + f_{grad}(\Delta N) + f_{grad}(\Delta S)},$$

wherein x are the gradient functions of the equations shown above.

24. The method of claim 21 wherein said interpolation of chrominance, considering chrominance and luminance data, using results of said computing inverted and normalized gradient functions comprise an equation to interpolate the chrominance channels at luminance locations utilizing said inverted and normalized gradient functions $F_n(x)$:

$$C_{(x,y)} = F_n(\Delta W)C_{(x-1,y)} + F_n(\Delta E)C_{(x+1,y)} + F_n(\Delta N)C_{(x,y-1)} + F_n(\Delta S)C_{(x,y+1)} + L_{(x,y)} - F_n(\Delta W)L_{(x-1,y)} - F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by yellow and cyan and wherein $L_{(i,j)}$ is the luminance, approximated by magenta.

25. The method of claim 18 wherein said correction of the luminance channel comprises:
  computing two gradient functions, horizontally and vertically, using information from all color channels; and
  correcting luminance channel, horizontally or vertically, if, after evaluation, the gradient functions are not equal.

26. The method of claim 25 wherein said computation of two gradient functions comprises the equations:

$$\Delta H = \left|C_{(x-1,y)} - C_{(x+1,y)}\right| + \left|\frac{2L_{(x,y)} - L_{(x-2,y)} - L_{(x+2,y)}}{2}\right| \text{ and}$$

$$\Delta V = \left|C_{(x,y-1)} - C_{(x,y+1)}\right| + \left|\frac{2L_{(x,y)} - L_{(x,y-2)} - L_{(x,y+2)}}{2}\right|,$$

wherein $L_{(i,j)}$ is the luminance, approximated by magenta and wherein $C_{(i,j)}^Y$ is the yellow chrominance channel and $C_{(i,j)}^C$ is the cyan chrominance channel.

27. The method of claim 25 wherein said correction of the luminance channel, if, after
  evaluation, the gradient functions, horizontally and vertically, are not equal comprises the equations to correct the luminance channel:

$$L_{(x,y)} = \frac{2L_{(x,y)} + L_{(x-1,y)} + L_{(x+1,y)}}{4} +$$
$$\frac{2C_{(x,y)}^Y + 2C_{(x,y)}^C - C_{(x-1,y)}^Y - C_{(x-1,y)}^C - C_{(x+1,y)}^Y - C_{(x+1,y)}^C}{16}$$

if $\Delta H < \Delta V$, or $$L_{(x,y)} = \frac{2L_{(x,y)} + L_{(x,y-1)} + L_{(x,y+1)}}{4} +$$
$$\frac{2C_{(x,y)}^Y + 2C_{(x,y)}^C - C_{(x,y-1)}^Y - C_{(x,y-1)}^C - C_{(x,y+1)}^Y - C_{(x,y+1)}^C}{16}$$

if $\Delta H > \Delta V$, wherein $L_{(i,j)}$ is the luminance, approximated by magenta, $C_{(i,j)}^Y$ is the yellow chrominance channel and $C_{(i,j)}^C$ is the cyan chrominance channel.

28. The method of claim 18 wherein said correction of the chrominance channels comprises:
  computing inverted and normalized gradient functions in the four compass directions using enhanced chrominance and luminance data; and
  interpolating chrominance considering chrominance and enhanced luminance data using results from said computing inverted and normalized gradient functions in the four compass directions using enhanced chrominance and luminance data.

29. The method of claim 28 wherein said computation of inverted and normalized gradient functions in the four compass directions using enhanced chrominance and luminance data is comprising;

equations to compute said gradient functions comprising:

$$\Delta W = |2C_{(x-1,y)} - C_{(x-2,y)} - C_{(x+1,y)}| + |L_{(x,y)} - L_{(x-1,y)}|,$$

$$\Delta E = |2C_{(x+1,y)} - C_{(x-1,y)} - C_{(x+2,y)}| + |L_{(x,y)} - L_{(x+1,y)}|,$$

$$\Delta N = |2C_{(x,y-1)} - C_{(x,y-2)} - C_{(x,y+1)}| + |L_{(x,y)} - L_{(x,y-1)}|,$$

$$\Delta S = |2C_{(x,y-1)} - C_{(x,y-1)} - C_{(x,y+2)}| + |L_{(x,y)} - L_{(x,y+1)}|$$

wherein $L_{(i,j)}$ is the luminance, approximated by magenta and $C_{(i,j)}$ is the chrominance, approximated by yellow and cyan;

equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and an equation to normalize said inverted gradient functions:

$$F_n(x) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

30. The method of claim 28 wherein said interpolation of chrominance considering chrominance and enhanced luminance data using results of previous step comprise an equation to interpolate the chrominance channels utilizing said inverted and normalized gradient functions $F_n(x)$ determining correction of chrominance both at luminance locations and opposite chrominance locations:

$$C_{(x,y)} = F_n(\Delta W)C_{(x-1,y)} + F_n(\Delta E)C_{(x+1,y)} + F_n(\Delta N)$$
$$C_{(x,y-1)} + F_n(\Delta S)C_{(x,y+1)} + L_{(x,y)} - F_n(\Delta W)L_{(x-1,y)} -$$
$$F_n(\Delta E)L_{(x+1,y)} - F_n(\Delta N)L_{(x,y-1)} - F_n(\Delta S)L_{(x,y+1)},$$

wherein $L_{(i,j)}$ is the luminance, approximated by magenta and $C_{(i,j)}$ is the chrominance, approximated by yellow and cyan.

31. A method to obtain a full color image by estimating the missing color information of a single sensor camera comprising:

providing an exposure unit comprising a Diagonal Bayer Pattern color filter array (CFA), an analog/digital converter of the raw image, an interpolation unit, and a color processing unit;

interpolating luminance channel used as proxy for green comprising
computing inverted and normalized gradient functions in the four compass directions using luminance and chrominance data; and then
interpolating the luminance considering luminance and chrominance data using results of said computing inverted and normalized gradient functions in the four compass directions using luminance and chrominance data;

interpolating chrominance channel used as proxy for red and blue;
correcting luminance channel; and
correcting chrominance channel.

32. The method of claim 31 wherein said computation of inverted and normalized gradient functions in the four compass direction is comprising:

equations to compute the gradient functions comprising:

$$\Delta W = |2L_{(x-1,y)} - L_{(x-3,y)} - L_{(x+1,y)}| + |C_{(x,y)} - C_{(x-2,y)}|,$$

$$\Delta E = |2L_{(x+1,y)} - L_{(x-1,y)} - L_{(x+3,y)}| + |C_{(x,y)} - C_{(x+2,y)}|,$$

$$\Delta N = |2L_{(x,y-1)} - L_{(x,y-3)} - L_{(x,y+1)}| + |C_{(x,y)} - C_{(x,y-2)}|, \text{ and}$$

$$\Delta S = |2L_{(x,y+1)} - L_{(x,y-1)} - L_{(x,y+1)}| + |C_{(x,y)} - C_{(x,y+2)}|,$$

wherein $L_{(i,j)}$ is the luminance, approximated by green and $C_{(i,j)}$ is the chrominance, approximated by red and blue;

equations to invert these gradients above comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and equations to normalize the inverted gradient functions above comprising:

$$F_n(x) = \frac{f_{grad}(x)}{f_{grad}(\Delta W) + f_{grad}(\Delta E) + fgrad(\Delta N) + f_{grad}(\Delta S)}$$

wherein x are the gradient functions of the equations shown above.

33. The method of claim 31 wherein said interpolation of the luminance considering luminance and chrominance data using results of previous step comprises an equation to interpolate missing luminance values utilizing normalized inverted gradient function in four compass directions:

$$L_{(x,y)} = F_n(\Delta W)L_{(x-1,y)} + F_n(\Delta E)L_{(x+1,y)} + F_n(\Delta N)L_{(x,y-1)} + F_n(\Delta S)L_{(x,y+1)} +$$
$$\frac{C_{(x,y)} - F_n(\Delta W)C_{(x-2,y)} - F_n(\Delta E)C_{(x+2,y)} - F_n(\Delta N)C_{(x,y-2)} - F_n(\Delta S)C_{(x,y+2)}}{2},$$

wherein $L_{(i,j)}$ is the luminance, approximated by green and $C_{(i,j)}$ is the chrominance, approximated by red or blue.

34. The method of claim 31 wherein said interpolation of the chrominance channels comprises:
estimating chrominance at opposite chrominance locations using luminance and chrominance data considered;
computing inverted and normalized gradient functions in the four compass directions using chrominance and luminance data; and
interpolating chrominance considering chrominance and luminance data using results of said computing inverted and normalized gradient functions in the four compass directions using chrominance and luminance data.

35. The method of claim 34 wherein said estimation of chrominance at opposite chrominance locations comprises an equation to compute said estimation:

$$C_{(x,y)} = L_{(x,y)} + \frac{(C_{(x-1,y+1)} - L_{(x-1,y+1)}) + (C_{(x+1,y-1)} - L_{(x+1,y-1)})}{2}$$

wherein $L_{(i,j)}$ is the luminance, approximated by green and wherein $C_{(i,j)}$ is the chrominance, approximated by red and blue.

36. The method of claim 34 wherein said computation of inverted and normalized gradient functions in the four compass directions using chrominance and luminance data is comprising:
equations to compute said gradient functions comprising:

$$\Delta W = |2C_{(x-1,y)} - C_{(x-3,y)} - C_{(x+1,y)}| + |L_{(x,y)} - L_{(x-1,y)}|,$$

$$\Delta E = |2C_{(x+1,y)} - C_{(x-1,y)} - C_{(x+3,y)}| + |L_{(x,y)} - L_{(x+1,y)}|,$$

$$\Delta N = |2C_{(x,y-1)} - C_{(x,y-3)} - C_{(x,y+1)}| + |L_{(x,y)} - L_{(x,y-1)}|, \text{ and}$$

$$\Delta S = |2C_{(x,y+1)} - C_{(x,y-1)} - C_{(x,y+3)}| + |L_{(x,y)} - L_{(x,y+1)}|,$$

wherein $C_{(i,j)}$ is the chrominance, approximated by red or blue and wherein $L_{(i,j)}$ is the luminance, approximated by green;
equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and
an equation to normalize said inverted gradient functions:

$$F_n(x) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

37. The method of claim 34 wherein said interpolation of chrominance considering chrominance and luminance data using results of said computing inverted and normalized gradient functions in the four compass directions using chrominance and luminance data comprise an equation to interpolate the chrominance channels at luminance locations utilizing said inverted and normalized gradient functions $F_n(x)$:

$$C_{(x,y)} = F_n(\Delta W)C_{(x-1,y)} + F_n(\Delta E)C_{(x+1,y)} + F_n(\Delta N)C_{(x,y-1)} + F_n(\Delta S)C_{(x,y+1)} + L_{(x,y)} - F_n(\Delta W)L_{(x-1,y)} - F_n(\Delta E)L_{(x+1,y)} - F_n(\Delta N)L_{(x,y-1)} - F_n(\Delta S)L_{(x,y+1)}),$$

wherein $C_{(i,j)}$ is the chrominance, approximated by red or blue and wherein $L_{(i,j)}$ is the luminance, approximated by green.

38. The method of claim 31 wherein said correction of the luminance channel comprises:
computing two gradient functions, horizontally and vertically, using information from all color channels; and
correcting luminance channel, horizontally or vertically, if, after evaluation, the gradient functions are not equal.

39. The method of claim 38 wherein said computation of two gradient functions comprises the equations:

$$\Delta H = |C_{(x-1,y)} - C_{(x+1,y)}| + \left|\frac{2L_{(x,y)} - L_{(x-1,y)} - L_{(x+1,y)}}{2}\right| \text{ and}$$

$$\Delta V = |C_{(x,y-1)} - C_{(x,y+1)}| + \left|\frac{2L_{(x,y)} - L_{(x,y-1)} - L_{(x,y+1)}}{2}\right|,$$

wherein $L_{(i,j)}$ is the luminance, approximated by green and wherein $C_{(i,j)}^R$ is red chrominance channel and $C_{(i,j)}^B$ is the blue chrominance channel.

40. The method of claim 38 wherein said correction of the luminance channel, if, after
evaluation, the gradient functions, horizontally and vertically, are not equal
comprises the equations to correct the luminance channel:

$$L_{(x,y)} = \frac{2L_{(x,y)} + L_{(x-1,y)} + L_{(x+1,y)}}{4} +$$
$$\frac{2C^R_{(x,y)} + 2C^B_{(x,y)} - C^R_{(x-1,y)} - C^B_{(x-1,y)} - C^R_{(x+1,y)} - C^B_{(x+1,y)}}{16}$$

if $\Delta H < \Delta V$, or $$L_{(x,y)} = \frac{2L_{(x,y)} + L_{(x,y-1)} + L_{(x,y+1)}}{4} +$$
$$\frac{2C^R_{(x,y)} + 2C^B_{(x,y)} - C^R_{(x,y-1)} - C^B_{(x,y-1)} - C^R_{(x,y+1)} - C^B_{(x,y+1)}}{16}$$

if $\Delta H > \Delta V$, wherein $L_{(i,j)}$ is the luminance, approximated by green, $C_{(i,j)}^R$ is the red chrominance channel and $C_{(i,j)}^B$ is the blue chrominance channel.

41. The method of claim 31 wherein said correction of the chrominance channels comprises:
computing inverted and normalized gradient functions in the four compass directions using enhanced chrominance and luminance data; and
interpolating chrominance considering chrominance and enhanced luminance data using results from said computing inverted and normalized gradient functions in the four compass directions using enhanced chrominance and luminance data.

42. The method of claim 41 wherein said computation of inverted and normalized gradient functions in the four compass directions using enhanced chrominance and luminance data is comprising:
equations to compute said gradient functions comprising:

$$\Delta W = |2C_{(x-1,y)} - C_{(x-2,y)} - C_{(x+1,y)}| + |L_{(x,y)} - L_{(x-1,y)}|,$$

$$\Delta E = |2C_{(x+1,y)} - C_{(x-1,y)} - C_{(x+2,y)}| + |L_{(x,y)} - L_{(x+1,y)}|,$$

$$\Delta N = |2C_{(x,y-1)} - C_{(x,y-2)} - C_{(x,y+1)}| + |L_{(x,y)} - L_{(x,y-1)}|,$$

$$\Delta S = |2C_{(x,y+1)} - C_{(x,y-1)} - C_{(x,y+2)}| + |L_{(x,y)} - L_{(x,y+1)}|,$$

wherein $C_{(i,j)}$ is the chrominance, approximated by red or blue and wherein $L_{(i,j)}$ is the luminance, approximated by green;
equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and
an equation to normalize said inverted gradient functions:

$$F_n(x) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

43. The method of claim 41 wherein said interpolation of chrominance considering chrominance and enhanced luminance data using results of said computing inverted and normalized gradient functions in the four compass directions using enhanced chrominance and luminance data comprises an equation to interpolate the chrominance channels utilizing said inverted and normalized gradient functions $F_n(x)$ determining correction of chrominance both at luminance locations and opposite chrominance locations:

$$C_{(x,y)} = F_n(\Delta W)C_{(x-1,y)} + F_n(\Delta E)C_{(x+1,y)} + F_n(\Delta N)C_{(x,y-1)} + F_n(\Delta S)C_{(x,y+1)} + L_{(x,y)} - F_n(\Delta W)L_{(x-1,y)} - F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by red or blue and wherein $L_{(i,j)}$ is the luminance, approximated by green.

44. A method to obtain a full color image by estimating the missing color information of a single sensor camera comprising:
providing an exposure unit comprising a color filter array (CFA), an analog/digital converter of the raw image, an interpolation unit, and a color processing unit;
computing gradient functions in specific directions using luminance and chrominance data to prepare an interpolation of the luminance channel;
interpolating the luminance considering luminance and chrominance data using results of said computing gradient functions in specific directions using luminance and chrominance data to prepare an interpolation of the luminance channel;
estimating chrominance at opposite chrominance locations using luminance and chrominance data considered;
computing gradient functions in specific directions, using chrominance and luminance data to prepare an interpolation of the chrominance channel;
interpolating chrominance at luminance locations considering chrominance and luminance data using results from said computing gradient functions in specific directions, using chrominance and luminance data to prepare an interpolation of the chrominance channel;
computing two gradient functions, horizontally and vertically, using information from all color channels to prepare a correction of the luminance channel;
correcting the luminance channel horizontally and vertically if the gradient functions are not equal;
computing gradient functions using enhanced chrominance and luminance data to prepare a correction of the chrominance channel.; and
interpolating chrominance determining correction of chrominance both at luminance and opposite chrominance locations considering chrominance and enhanced luminance data using results from said computing gradient functions using enhanced chrominance and luminance data to prepare a correction of the chrominance channel.

45. The method of claim 44 wherein said color filter array is a Bayer Pattern R-G-B CFA.

46. The method of claim 44 wherein said color filter array is a C-M-Y CFA and wherein said C-M-Y values are converted to R-G-B values.

47. The method of claim 44 wherein said computation of gradient functions to prepare the interpolation of the luminance channel comprises:
equations to compute gradient functions in the four compass directions comprising:

$$\Delta W = |2L_{(x-1,y)} - L_{(x-3,y)} - L_{(x+1,y)}| + |C_{(x,y)} - C_{(x-2,y)}|,$$

$$\Delta E = |2L_{(x+1,y)} - L_{(x-1,y)} - L_{(x+3,y)}| + |C_{(x,y)} - C_{(x+2,y)}|,$$

$$\Delta N = |2L_{(x,y-1)} - L_{(x,y-3)} - L_{(x,y+1)}| + |C_{(x,y)} - C_{(x,y-2)}|, \text{ and}$$

$$\Delta S = |2L_{(x,y+1)} - L_{(x,y-1)} - L_{(x,y+1)}| + |C_{(x,y)} - C_{(x,y+2)}|,$$

wherein $L_{(i,j)}$ is the luminance, approximated by green and $C_{(i,j)}$ is the chrominance, approximated by red and blue;
equations to invert these gradients above comprising:

$$f_{grad}(x) = \frac{1}{x} \text{ for } x \neq 0, \text{ and}$$

$$f_{grad}(x) = 1 \text{ for } x = 0,$$

wherein x are the gradient functions of the equations shown above; and
equations to normalize the inverted gradient functions above comprising:

$$F_n(x) = \frac{f_{grad}(x)}{f_{grad}(\Delta W) + f_{grad}(\Delta E) + fgrad(\Delta N) + f_{grad}(\Delta S)}$$

wherein x are the gradient functions of the equations shown above.

48. The method of claim 44 wherein said interpolation of the luminance channel considering luminance and chrominance data using results of said computing gradient functions in specific directions, using chrominance and luminance data to prepare an interpolation of the chrominance channel comprises an equation to interpolate missing luminance values utilizing normalized inverted gradient functions in four compass directions:

$$L_{(x,y)} = F_n(\Delta W)L_{(x-1,y)} + F_n(\Delta E)L_{(x+1,y)} + F_n(\Delta N)L_{(x,y-1)} + F_n(\Delta S)L_{(x,y+1)} + \frac{C_{(x,y)} - F_n(\Delta W)C_{(x-2,y)} - F_n(\Delta E)C_{(x+2,y)} - F_n(\Delta N)C_{(x,y-2)} - F_n(\Delta S)C_{(x,y+2)}}{2},$$

wherein $L_{(i,j)}$ is the luminance, approximated by green and $C_{(i,j)}$ is the chrominance, approximated by red or blue.

49. The method of claim 44 wherein said estimation of chrominance at opposite chrominance locations comprises an equation to compute said estimation:

$$C_{(x,y)} = L_{(x,y)} + \frac{(C_{(x-1,y-1)} - L_{(x-1,y-1)}) + (C_{(x+1,y-1)} - L_{(x+1,y-1)})}{4} + \frac{(C_{(x-1,y+1)} - L_{(x-1,y+1)}) + (C_{(x+1,y+1)} - L_{(x+1,y+1)})}{4}$$

wherein $L_{(i,j)}$ is the luminance, approximated by green and wherein $C_{(i,j)}$ is the chrominance, approximated by red and blue.

50. The method of claim 44 wherein said computation of gradient functions to prepare a interpolation of the chrominance channel using chrominance and luminance data comprises:
equations to compute said gradient functions in the four compass directions:

$$\Delta W = |2C_{(x-1,y)} - C_{(x-3,y)} - C_{(x+1,y)}| + |L_{(x,y)} - L_{(x-1,y)}|,$$

$$\Delta E = |2C_{(x+1,y)} - C_{(x-1,y)} - C_{(x+3,y)}| + |L_{(x,y)} - L_{(x+1,y)}|,$$

$$\Delta N = |2C_{(x,y-1)} - C_{(x,y-3)} - C_{(x,y+1)}| + |L_{(x,y)} - L_{(x,y-1)}|, \text{ and}$$

$$\Delta S = |2C_{(x,y+1)} - C_{(x,y-1)} - C_{(x,y+3)}| + |L_{(x,y)} - L_{(x,y+1)}|,$$

wherein $C_{(i,j)}$ is the chrominance, approximated by red or blue and wherein $L_{(i,j)}$ is the luminance, approximated by green;

equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and an equation to normalize said inverted gradient functions:

$$F_n(x) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

51. The method of claim 44 wherein said interpolation of chrominance considering chrominance and luminance data using results of said computing gradient functions using enhanced chrominance and luminance data to prepare a correction of the chrominance channel comprises an equation to interpolate the chrominance channels utilizing said inverted and normalized gradient functions $F_n(x)$:

$$C_{(x,y)} = F_n(\Delta W)C_{(x-1,y)} + F_n(\Delta E)C_{(x+1,y)} + F_n(\Delta N)$$
$$C_{(x,y-1)} + F_n(\Delta S)C_{(x,y+1)} + L_{(x,y)} - F_n(\Delta W)L_{(x-1,y)} - $$
$$F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by red or blue and wherein $L_{(i,j)}$ is the luminance, approximated by green.

52. The method of claim 44 wherein said computation of two gradient functions, horizontally and vertically comprises the equations:

$$\Delta H = \left|C_{(x-1,y)} - C_{(x+1,y)}\right| + \left|\frac{2L_{(x,y)} - L_{(x-2,y)} - L_{(x+2,y)}}{2}\right| \text{ and}$$

$$\Delta V = \left|C_{(x,y-1)} - C_{(x,y+1)}\right| + \left|\frac{2L_{(x,y)} - L_{(x,y-2)} - L_{(x,y+2)}}{2}\right|,$$

wherein $L_{(i,j)}$ is the luminance, approximated by green and wherein $C_{(i,j)}^R$ is red chrominance channel and $C_{(i,j)}^B$ is the blue chrominance channel.

53. The method of claim 44 wherein said correction of the luminance channel, if, after evaluation, the gradient functions, horizontally and vertically, are not equal comprises the equations to correct the luminance channel:

$$L_{(x,y)} = \frac{2L_{(x,y)} + L_{(x-1,y)} + L_{(x+1,y)}}{4} +$$
$$\frac{2C_{(x,y)}^R + 2C_{(x,y)}^B - C_{(x-1,y)}^R - C_{(x-1,y)}^B - C_{(x+1,y)}^R - C_{(x+1,y)}^B}{16}$$

if $\Delta H < \Delta V$, or $$L_{(x,y)} = \frac{2L_{(x,y)} + L_{(x,y-1)} + L_{(x,y+1)}}{4} +$$
$$\frac{2C_{(x,y)}^R + 2C_{(x,y)}^B - C_{(x,y-1)}^R - C_{(x,y-1)}^B - C_{(x,y+1)}^R - C_{(x,y+1)}^B}{16}$$

if $\Delta H > \Delta V$, wherein $L_{(i,j)}$ is the luminance, approximated by green, $C_{(i,j)}^R$ is the red chrominance channel and $C_{(i,j)}^R$ is the blue chrominance channel.

54. The method of claim 44 wherein said computation of gradient functions to prepare a correction of the chrominance channel using enhanced chrominance and luminance data comprises:

equations to compute said gradient functions in the four compass directions:

$$\Delta W = |2C_{(x-1,y)} - C_{(x-2,y)} - C_{(x+1,y)}| + |L_{(x,y)} - L_{(x-1,y)}|,$$

$$\Delta E = |2C_{(x+1,y)} - C_{(x-1,y)} - C_{(x+2,y)}| + |L_{(x,y)} - L_{(x+1,y)}|,$$

$$\Delta N = |2C_{(x,y-1)} - C_{(x,y-2)} - C_{(x,y+1)}| + |L_{(x,y)} - L_{(x,y-1)}|,$$

$$\Delta S = |2C_{(x,y+1)} - C_{(x,y-1)} - C_{(x,y+2)}| + |L_{(x,y)} - L_{(x,y+1)}|,$$

wherein $C_{(i,j)}$ is the chrominance, approximated by red or blue and wherein $L_{(i,j)}$ is the luminance, approximated by green;

equations to invert said gradient functions comprising:

$$f_{grad}(x) = \frac{1}{x} \quad \text{for } x \neq 0, \text{ and}$$

$$f_{grad}(x) = 1 \quad \text{for } x = 0,$$

wherein x are the gradient functions of the equations shown above; and an equation to normalize said inverted gradient functions:

$$F_n(X) = \frac{f_{grad}(x)}{f_{grad}(\Delta W) + f_{grad}(\Delta E) + fgrad(\Delta N) + f_{grad}(\Delta S)},$$

wherein x are the gradient functions of the equations shown above.

55. The method of claim 44 wherein said interpolation of chrominance considering chrominance and enhanced luminance data comprise an equation to interpolate the chrominance channels utilizing said inverted and normalized gradient functions $F_n(x)$ determining correction of chrominance both at luminance locations and opposite chrominance locations:

$$C_{(x,y)} = F_n(\Delta W)C_{(x-1,y)} + F_n(\Delta E)C_{(x+1,y)} + F_n(\Delta N)$$
$$C_{(x,y-1)} + F_n(\Delta S)C_{(x,y+1)} + + L_{(x,y)} - F_n(\Delta W)L_{(x-1,y)} - $$
$$F_n(\Delta E)L_{(x+1,y)} - F_n(\Delta N)L_{(x,y-1)} - F_n(\Delta S)L_{(x,y+1)},$$

wherein $C_{(i,j)}$ is the chrominance, approximated by red or blue and wherein $L_{(i,j)}$ is the luminance, approximated by green.

56. An apparatus to obtain a full color image by estimating the missing color information of a single sensor camera comprising:

an exposure unit comprising a color filter array (CFA);

an analog/digital converter of the raw image;

an interpolation unit, wherein said interpolation unit is estimating the missing color information by a set of weighted values obtained by gradient functions and wherein the set of weighted functions is found from neighboring pixels in specific directions, and its interpolation of a luminance channel comprises computing inverted and normalized gradient functions in said specific directions using luminance and chrominance data, and interpolating the luminance considering the luminance and chrominance data; and a color processing unit.

57. The apparatus of claim 56 wherein said CFA is a Bayer Pattern R-G-B filter array.

58. The apparatus of claim 56 wherein said CFA is a Complementary Bayer Pattern filter array.

59. The apparatus of claim 56 wherein said CFA is a Diagonal Bayer Pattern filter array.

60. The apparatus of claim 56 wherein said CFA is a Complementary Diagonal Bayer Pattern filter array.

61. The apparatus of claim 56 wherein said set of weighted functions is found from neighboring pixels in horizontal and vertical directions.

62. The apparatus of claim 56 wherein said set of weighted functions is found from neighboring pixels in the four compass directions.

63. The apparatus of claim 56 wherein luminance is used as a proxy for the green channel and chrominance is used as a proxy for the red and blue channel.

64. The apparatus of claim 56 wherein luminance is used as a proxy for the magenta channel and chrominance is used as a proxy for the yellow and cyan channel.

* * * * *